US012771768B2

(12) United States Patent
Soh

(10) Patent No.: US 12,771,768 B2
(45) Date of Patent: Oct. 20, 2026

(54) DISPLAY DEVICE AND FOLDABLE ELECTRONIC DEVICE

(71) Applicant: Samsung Display Co., LTD., Yongin-si (KR)

(72) Inventor: Yong Kwon Soh, Yongin-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 294 days.

(21) Appl. No.: 18/529,164

(22) Filed: Dec. 5, 2023

(65) Prior Publication Data

US 2024/0187508 A1 Jun. 6, 2024

(30) Foreign Application Priority Data

Dec. 6, 2022 (KR) ........................ 10-2022-0168592

(51) Int. Cl.
*H04M 1/02* (2006.01)
*G06F 1/16* (2006.01)

(52) U.S. Cl.
CPC ........ *H04M 1/0268* (2013.01); *G06F 1/1652* (2013.01); *H04M 1/0214* (2013.01); *G06F 1/1681* (2013.01)

(58) Field of Classification Search
CPC .. G06F 1/1652; G06F 1/1681; H04M 1/0268; H04M 1/0214
See application file for complete search history.

(56) References Cited

U.S. PATENT DOCUMENTS

| | | | | |
|---|---|---|---|---|
| 9,983,424 B2 | 5/2018 | Kim et al. | | |
| 11,204,628 B2 | 12/2021 | Paek et al. | | |
| 11,366,494 B2 * | 6/2022 | Soh | ........................ | G06F 1/1652 |
| 11,417,848 B2 * | 8/2022 | Soh | ........................ | G06F 1/1652 |
| 11,474,564 B2 * | 10/2022 | Soh | ........................ | G06F 1/1652 |
| 11,626,565 B2 * | 4/2023 | Park | ........................ | B32B 15/08 257/40 |
| 12,222,774 B2 * | 2/2025 | Choi | ..................... | G06F 1/1643 |
| 2017/0082896 A1 * | 3/2017 | Jang | ...................... | C09D 133/02 |
| 2020/0266368 A1 * | 8/2020 | Park | .................. | B32B 17/10027 |
| 2020/0267293 A1 * | 8/2020 | Noh | ......................... | G02B 7/02 |
| 2021/0096600 A1 * | 4/2021 | Soh | ........................ | G06F 1/1652 |

(Continued)

FOREIGN PATENT DOCUMENTS

| | | |
|---|---|---|
| KR | 10-2016-0144912 | 12/2016 |
| KR | 10-2020-0082363 | 7/2020 |

(Continued)

*Primary Examiner* — Patrick F Marinelli
(74) *Attorney, Agent, or Firm* — F. CHAU & ASSOCIATES, LLC

(57) ABSTRACT

A display device includes a display panel including a first area, a folding area, and a second area, the folding area being foldable about a folding axis, a first plate disposed on a rear surface of the display panel in the first area, a second plate disposed on the rear surface of the display panel in the second area and spaced apart from the first plate, a flexible thin-film layer disposed on the rear surface and including a first portion covering at least an area of the first plate, a second portion covering at least an area of the second plate, and a third portion connecting the first and second portions and disposed on the folding area, and a guide that covers the second portion of the flexible thin-film layer and at least an area of the second plate.

18 Claims, 9 Drawing Sheets

(56) References Cited

U.S. PATENT DOCUMENTS

| | | | | |
|---|---|---|---|---|
| 2021/0210715 | A1 * | 7/2021 | Soh | G09F 9/301 |
| 2021/0216106 | A1 * | 7/2021 | Soh | G06F 1/1652 |
| 2024/0187508 | A1 * | 6/2024 | Soh | G06F 1/1652 |
| 2025/0338408 | A1 * | 10/2025 | Soh | G06F 1/1637 |

FOREIGN PATENT DOCUMENTS

| | | |
|---|---|---|
| KR | 10-2021-0091848 | 7/2021 |
| KR | 10-2021-0097258 | 8/2021 |

* cited by examiner

DISPLAY DEVICE AND FOLDABLE ELECTRONIC DEVICE

CROSS REFERENCE TO RELATED APPLICATION(S)

This application claims priority to and the benefits of Korean Patent Application No. 10-2022-0168592 under 35 U.S.C. § 119, filed on Dec. 6, 2022, in the Korean Intellectual Property Office (KIPO), the entire contents of which are incorporated herein by reference.

BACKGROUND

1. Technical Field

Various embodiments of the disclosure relate to a display device and a foldable electronic device.

2. Description of the Related Art

A mobile electronic device such as a smartphone or the like may provide various functions including a call, video play, internet search, and the like based on various types of applications. A user may desire to use the above-described various functions through a wider screen. However, as a display area increases, portability may be deteriorated. Thus, a foldable electronic device that can enhance portability using a foldable structure has been proposed. For example, the foldable electronic device may include a hinge structure and first and second housings connected in opposite directions and may be rotatable with respect to the hinge structure. Such a foldable electronic device may include a foldable display disposed on the first and second housings in an unfolded state.

SUMMARY

Various embodiments of the disclosure are directed to a display device and a foldable electronic device including a flexible display panel with improved flexibility and durability.

However, objects of the disclosure are not limited to the above-described objects, and various modifications are possible without departing from the spirit and scope of the disclosure.

According to an embodiment, a display device may include a display panel including a first area, a folding area, and a second area arranged in a first direction, the folding area being foldable about a folding axis parallel to a second direction intersecting the first direction, a first plate disposed on a rear surface of the display panel in the first area, a second plate disposed on the rear surface of the display panel in the second area and spaced apart from the first plate in the first direction, a flexible thin-film layer disposed on the rear surface of the display panel and including: a first portion covering at least an area of the first plate, a second portion covering at least an area of the second plate, and a third portion connecting the first portion and the second portion and disposed on the folding area, and a guide that covers the second portion of the flexible thin-film layer and at least an area of the second plate. In case that the display panel is converted between a folded state and an unfolded state, the first portion of the flexible thin-film layer may be attached to the first plate, and the second portion of the flexible thin-film layer may slide between the guide and the second plate.

In an embodiment, the display device may further include a first adhesive element disposed between the first plate and the first portion of the flexible thin-film layer. The first portion of the flexible thin-film layer may be attached to an area of the first plate by the first adhesive element.

In an embodiment, the second portion of the flexible thin-film layer may protrude from the third portion in the first direction, and a shape of the flexible thin-film layer may be symmetrical about an axis intersecting the folding axis.

In an embodiment, the guide may extend in the second direction, and opposite ends of the guide may be attached to at least an area of the second plate.

In an embodiment, the display device may further include at least one second adhesive element disposed between the second plate and the guide. The guide may be attached to at least an area of the second plate by the at least one second adhesive element.

In an embodiment, each of the first adhesive element and the at least one second adhesive element may include at least one of a double-sided tape, a general adhesive, a thermo-responsive adhesive, and an optical clear adhesive (OCA).

In an embodiment, a thickness of the at least one second adhesive element and a thickness of the flexible thin-film layer may be same in a thickness direction of the display panel.

In an embodiment, in case that the display panel is in the unfolded state, the at least one second adhesive element and the flexible thin-film layer may be disposed on a same plane.

In an embodiment, the at least one second adhesive element may include a plurality of second adhesive elements, and the second portion of the flexible thin-film layer may be disposed between the plurality of second adhesive elements.

In an embodiment, the plurality of second adhesive elements may include a 2-1-th adhesive element, and a 2-2-th adhesive element arranged in the second direction. In case that the display panel is converted between the folded state and the unfolded state, the second portion of the flexible thin-film layer may slide between the 2-1-th adhesive element and the 2-2-th adhesive element.

In an embodiment, the plurality of second adhesive elements may include a 2-1-th adhesive element, a 2-2-th adhesive element, and a 2-3-th adhesive element arranged in the second direction. In case that the display panel is converted between the folded state and the unfolded state, the second portion of the flexible thin-film layer may slide between the 2-1-th adhesive element and the 2-2-th adhesive element and between the 2-2-th adhesive element and the 2-3-th adhesive element.

In an embodiment, the second portion and the third portion of the flexible thin-film layer may not be attached to the second plate nor the folding area of the display panel.

In an embodiment, the display device may further include a step difference compensator disposed between the folding area of the display panel and the third portion of the flexible thin-film layer.

In an embodiment, the step difference compensator may be attached to the third portion of the flexible thin-film layer, and may not be attached to the folding area of the display panel.

In an embodiment, in case that the display panel is in the folded state, a distance between the first plate and the first portion of the flexible thin-film layer may be less than a distance between the second plate and the second portion of the flexible thin-film layer.

In an embodiment, in case that the display panel is in the folded state, a space may be formed between the display panel and the third portion of the flexible thin-film layer.

In an embodiment, the display panel may include a curved surface having a first curvature in case that the display panel is in the folded state, and the flexible thin-film layer may include a curved surface having a second curvature larger than the first curvature.

According to an embodiment of the disclosure, a foldable electronic device may include a first housing, a second housing connected to the first housing through a hinge structure and rotatable about the hinge structure, a display panel disposed on an area of the first housing and an area of the second housing, and foldable by rotation, a first plate disposed on a rear surface of the display panel, and facing the first housing, a second plate disposed on the rear surface of the display panel, facing the second housing, and spaced apart from the first plate in a first direction, a flexible thin-film layer including a first portion disposed on the rear surface of the display panel and overlaps the first plate in a thickness direction of the display panel, a second portion that overlaps the second plate in the thickness direction, and a third portion that connects the first portion and the second portion and disposed on the hinge structure, and a guide disposed on at least an area of the second plate and a rear surface of the second portion of the flexible thin-film layer. In case that the display panel is converted between a folded state and an unfolded state, the first portion of the flexible thin-film layer may be attached to the first plate, and the second portion of the flexible thin-film layer may slide under guidance of the guide.

In an embodiment, the foldable electronic device may further include a first adhesive element disposed between the first plate and the first portion of the flexible thin-film layer, and at least one second adhesive element disposed between the second plate and the guide. The at least one second adhesive element may not overlap the flexible thin-film layer in the thickness direction.

In an embodiment, the foldable electronic device may further include a step difference compensator disposed between the first plate and the second plate. The step difference compensator may be attached to the third portion of the flexible thin-film layer, and may not be attached to the display panel.

DETAILED DESCRIPTION OF THE EMBODIMENTS

Figure 1:
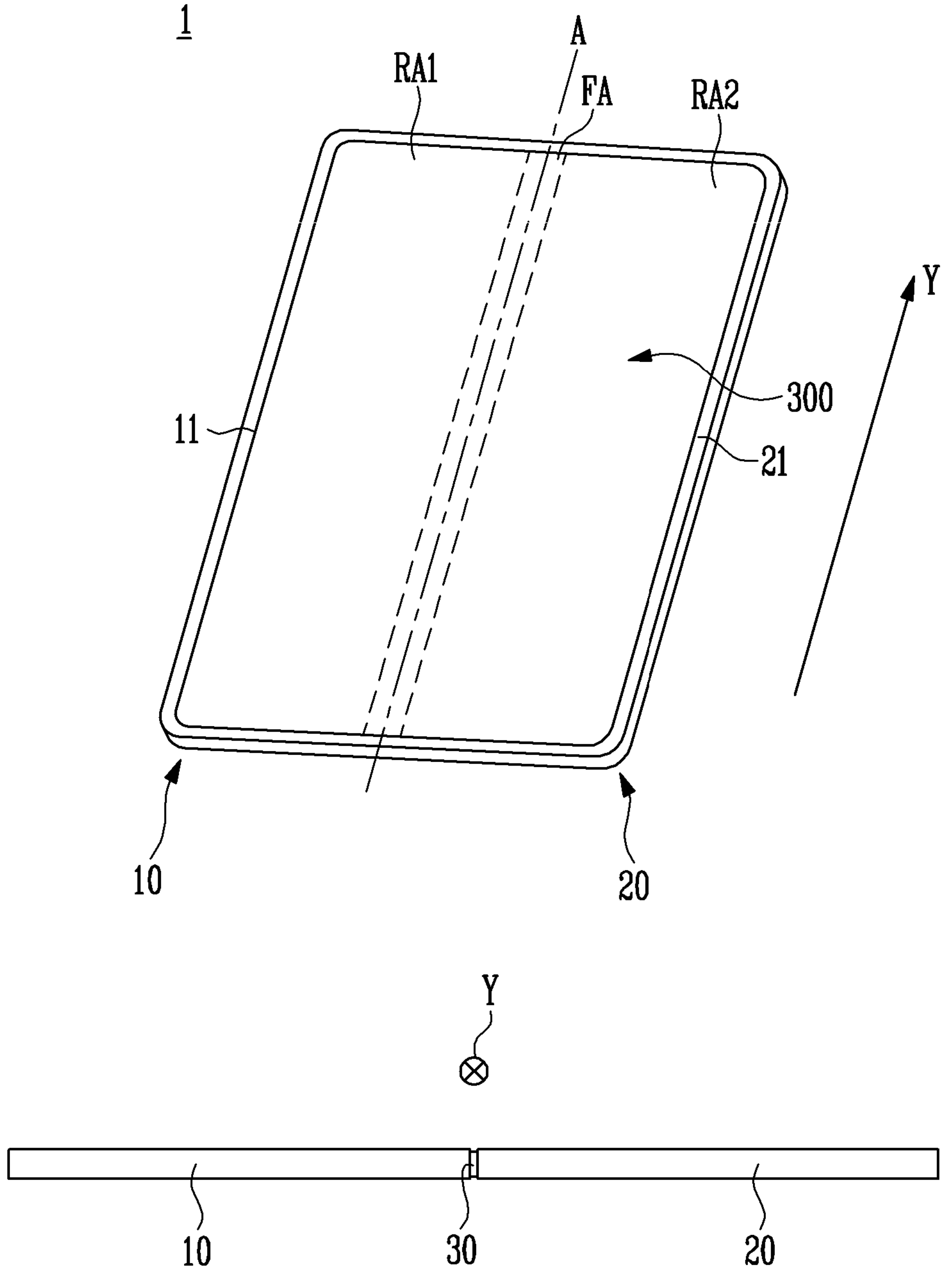
FIG. 1 is a schematic perspective view and a side view illustrating an embodiment of an unfolded state of a foldable electronic device.

In the following description, for the purposes of explanation, numerous specific details are set forth in order to provide a thorough understanding of various embodiments or implementations of the invention. As used herein “embodiments” and “implementations” are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Although the terms “first,” “second,” etc. may be used herein to describe various types of elements, these elements should not be limited by these terms. These terms are used to distinguish one element from another element. Thus, a first element discussed below could be termed a second element without departing from the teachings of the disclosure.

The terminology used herein is for the purpose of describing particular embodiments and is not intended to be limiting. As used herein, the singular forms, “a,” “an,” and “the” are intended to include the plural forms as well, unless the context clearly indicates otherwise. Moreover, the terms “comprises,” “comprising,” “includes,” and/or “including,” when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms “substantially,” “about,” and other similar terms, are used as terms of approximation and not as terms of degree, and, as such, are utilized to account for inherent deviations in measured, calculated, and/or provided values that would be recognized by one of ordinary skill in the art.

When an element, such as a layer, is referred to as being “on,” “connected to,” or “coupled to” another element or layer, it may be directly on, connected to, or coupled to the other element or layer or intervening elements or layers may be present. When, however, an element or layer is referred to as being “directly on,” “directly connected to,” or “directly coupled to” another element or layer, there are no intervening elements or layers present. To this end, the term “connected” may refer to physical, electrical, and/or fluid connection, with or without intervening elements. Further, the X-axis direction, the Y-axis direction, and the Z-axis direction are not limited to three directions of a rectangular coordinate system, such as the X-axis, Y-axis, and Z-axis directions, and may be interpreted in a broader sense. For example, the X-axis direction, the Y-axis direction, and the Z-axis direction may be perpendicular to one another, or may represent different directions that are not perpendicular to one another. For the purposes of this disclosure, “at least one of X, Y, and Z” and “at least one selected from the group consisting of X, Y, and Z” may be construed as X only, Y only, Z only, or any combination of two or more of X, Y, and Z, such as, for instance, XYZ, XYY, YZ, and ZZ.

Unless otherwise specified, the illustrated embodiments are to be understood as providing example features of the invention. Therefore, unless otherwise specified, the features, components, modules, layers, films, panels, regions, and/or aspects, etc. (hereinafter individually or collectively referred to as “elements”), of the various embodiments may be otherwise combined, separated, interchanged, and/or rearranged without departing from the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Hereinafter, embodiments of the disclosure will be described in greater detail with reference to the accompanying drawings. The same reference numerals are used throughout the different drawings to designate the same components, and repetitive description of the same components will be omitted.

Figure 2:
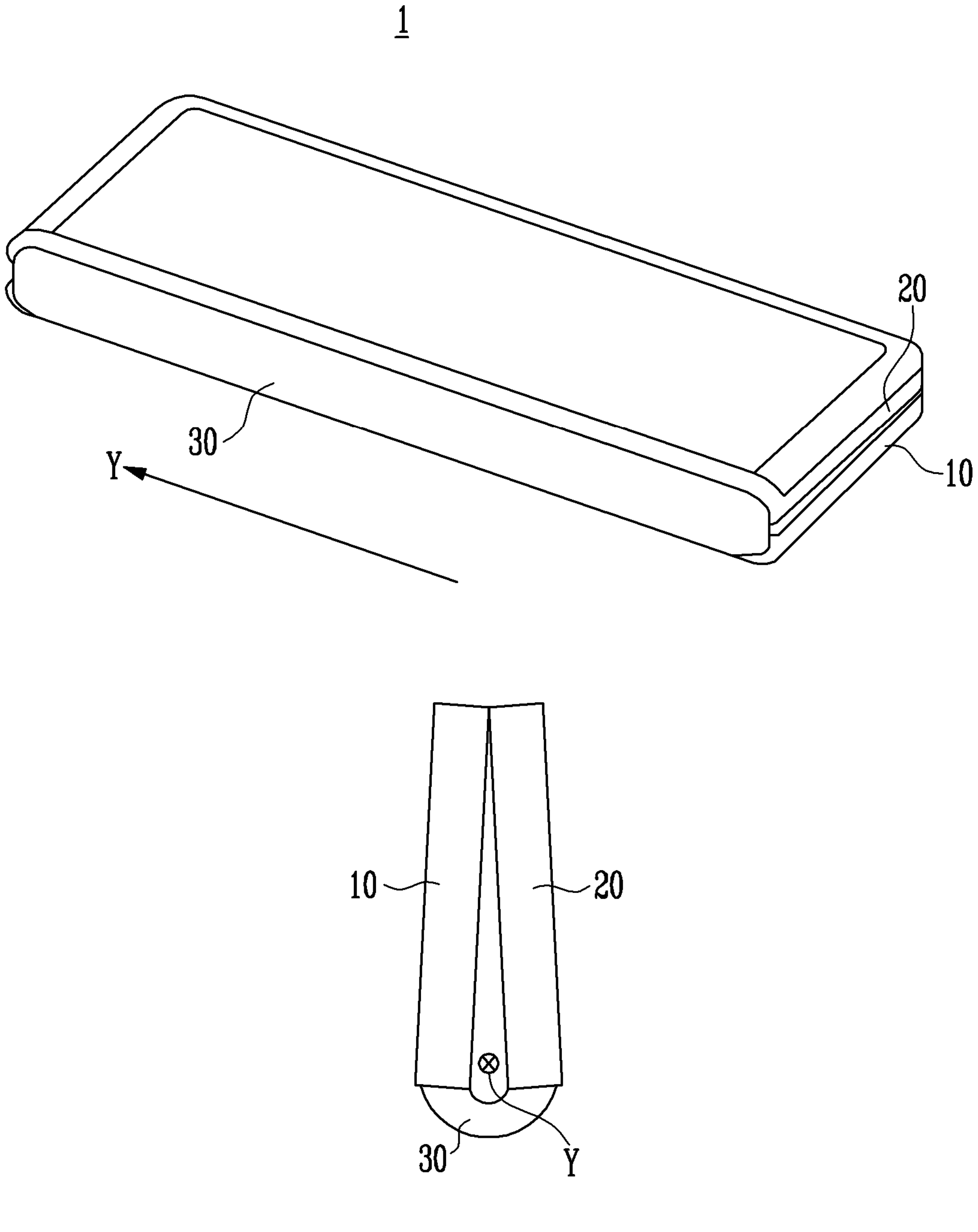
FIG. 2 is a schematic perspective view and a side view illustrating an embodiment of a folded state of the foldable electronic device shown in FIG. 1.
Figure 3:
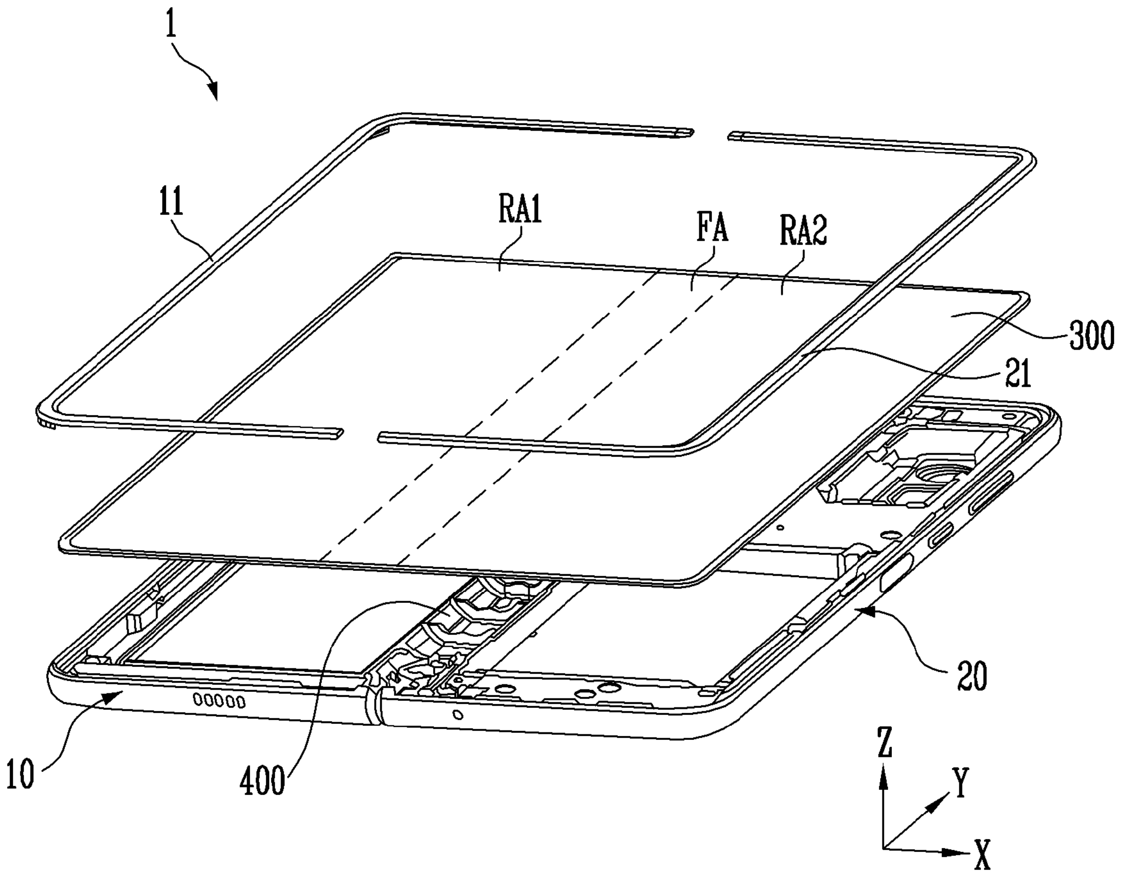
FIG. 3 is a schematic exploded perspective view illustrating an embodiment of the foldable electronic device shown in FIG. 1.

FIG. 1 is a schematic perspective view and a side view illustrating an embodiment of an unfolded state of a foldable electronic device. FIG. 2 is a schematic perspective view and a side view illustrating an embodiment of a folded state of the foldable electronic device shown in FIG. 1. FIG. 3 is a schematic exploded perspective view illustrating an embodiment of the foldable electronic device shown in FIG. 1.

Referring to FIGS. 1 to 3, a foldable electronic device 1 may include a first housing 10, a second housing 20, a hinge housing 30, a display 300, and a hinge structure 400.

A surface on which the display 300 is disposed may be a first surface or a front surface of the foldable electronic device 1, and a surface opposite to the front surface may be a second surface or a rear surface of the foldable electronic device 1.

The first housing 10 and the second housing 20 may be coupled with each other and rotatable about a folding axis A through the hinge structure 400. The first housing 10 and the second housing 20 may be connected to the hinge structure 400. The second housing 20 may rotate relative to the first housing 10 about the hinge structure 400 (or the folding axis A). The folding axis A may be a rotating axis parallel a second direction (e.g., +y direction).

The first housing 10 may include a first frame 11 which forms a portion of a side surface of the foldable electronic device 1. The second housing 20 may include a second frame 21 which forms a portion of a side surface of the foldable electronic device 1.

The first housing 10 and the second housing 20 may have symmetrical shapes. The first housing 10 and the second housing 20 may be disposed on opposite sides of the folding axis A, and the first housing 10 and the second housing 20 may generally have symmetrical shapes with respect to the folding axis A in the case where the foldable electronic device 1 is in the unfolded state. As will be described below, angles or distance between the first housing 10 and the second housing 20 may vary according to whether the foldable electronic device 1 is in the unfolded state, the folded state, or an intermediate state in which the device 1 is partially folded.

In an embodiment, the first housing 10 and the second housing 20 may have asymmetrical shapes. For instance, an image display area of the first housing 10 may be formed to be wider than an image display area of the second housing 20. Furthermore, referring to FIGS. 2 and 3, the hinge structure 400 may be formed in a central area between the first housing 10 and the second housing 20, and the first housing 10 and the second housing 20 may be folded to be symmetrical with respect to the central area. However, the disclosure is not limited thereto. The hinge structure 400 may be formed in an area other than the central area of the first housing 10, and the second housing 20 may be formed to be larger than the first housing 10.

The first housing 10 and the second housing 20 may include a recess that accommodates the display 300.

At least a portion of the first housing 10 and the second housing 20 may be formed of a metal or a non-metal having stiffness to support the display 300. At least a portion formed of a metal may provide a ground plane of the foldable electronic device 1, and may be electrically connected to a ground line formed on a printed circuit board.

The hinge housing 30 may be disposed between the first housing 10 and the second housing 20. The hinge housing 30 may protect the hinge structure 400. The hinge housing 30 may be covered by a portion of the first housing 10 and a portion of the second housing 20 or be exposed to an outside according to whether the foldable electronic device 1 is in the unfolded state or in the folded state.

As shown in FIG. 1, in the case where the foldable electronic device 1 is in the unfolded state, the hinge housing 30 may be covered by the first housing 10 and the second housing 20 and may not be exposed. In an embodiment, as shown in FIG. 2, in the case where the foldable electronic device 1 is in the folded state, the hinge housing 30 may be exposed to the outside between the first housing 10 and the second housing 20. In an embodiment, in the case where the foldable electronic device 1 is in the intermediate state where the first housing 10 and the second housing 20 form a certain angle, the hinge housing 30 may be partially exposed to the outside between the first housing 10 and the second housing 20. However, the hinge housing 30 may be less exposed in the intermediate state than in the fully folded state. In an embodiment, the hinge housing 30 may include a curved surface.

The hinge structure 400 may be disposed between the first housing 10 and the second housing 20. The hinge structure 400 may be disposed at a location corresponding to a folding area FA of the display 300.

The display 300 may be disposed on a space formed by the first housing 10 and the second housing 20. For example, the display 300 may be seated on the recess formed on the first housing 10 and the second housing 20, and may occupy most of the front surface of the foldable electronic device 1. The front surface of the foldable electronic device 1 may include the display 300, a portion of the first housing 10 adjacent to the display 300, and a portion of the second housing 20 adjacent to the display 300.

Referring to FIGS. 1 and 3, the display 300 may be a display of which at least a portion may be changed to be flat or curved. The display 300 may include a first area RA1, the folding area FA, and a second area RA2 arranged in a first direction (e.g., +x direction). The first area RA1 may be an area disposed on the first housing 10. The second area RA2 may be an area disposed on the second housing 20. The folding area FA may be disposed between the first area RA1 and the second area RA2. For example, the display 300 may include the first area RA1 disposed on a left side of the folding area FA, and the second area RA2 disposed on a right side of the folding area FA.

The first area RA1 and the second area RA2 may be formed in a flat shape, and the folding area FA may be formed to be changeable to be a flat or curved surface.

The first area RA1 and the second area RA2 may generally have symmetrical shapes with respect to the folding area FA. However, the disclosure is not limited thereto. Unlike the first area RA1, the second area RA2 may include a notch which is formed by cutting a portion of the second area RA2 according to a presence of another electronic component (e.g., camera or the like), but may have a shape symmetrical to a shape of the first area RA1 in other areas.

The hinge structure 400 may be connected to the first housing 10 and the second housing 20. The hinge structure 400 may be rotatable about the folding axis A. For example, in the case where the first housing 10 and the second housing 20 are folded or unfolded, the hinge structure 400 may rotate about the folding axis A parallel to the Y-axis direction.

Hereinafter, an operation of the first housing 10 and the second housing 20 according to the state of the foldable electronic device 1 (e.g., the unfolded state or the folded state) and each area of the display 300 will be described.

Referring to FIG. 1, in the case where the foldable electronic device 1 is in the unfolded state, the first housing 10 and the second housing 20 may be disposed to be oriented in a same direction while forming an angle of about 180 degrees. A surface of the first area RA1 and a surface of the second area RA2 of the display 300 may be oriented in the same direction (e.g., toward the front surface of the foldable electronic device 1) while forming the angle of about 180 degrees. The folding area FA, the first area RA1, and the second area RA2 may form a same plane. For example, the first area RA1 and the second area RA2 may be coplanar with each other.

Referring to FIG. 2, in the case where the foldable electronic device 1 is in the folded state, the first housing 10 and the second housing 20 may be disposed to face each other. The surface of the first area RA1 and the surface of the second area RA2 may face each other while forming a narrow angle (e.g., between about 0 degrees and about 10 degrees) between the surface of the first area RA1 and the surface of the second area RA2. At least a portion of the folding area FA may be formed of a curved surface having a curvature. Herein, the folded state of the foldable electronic device 1 may mean an in-folded state.

Figure 4:
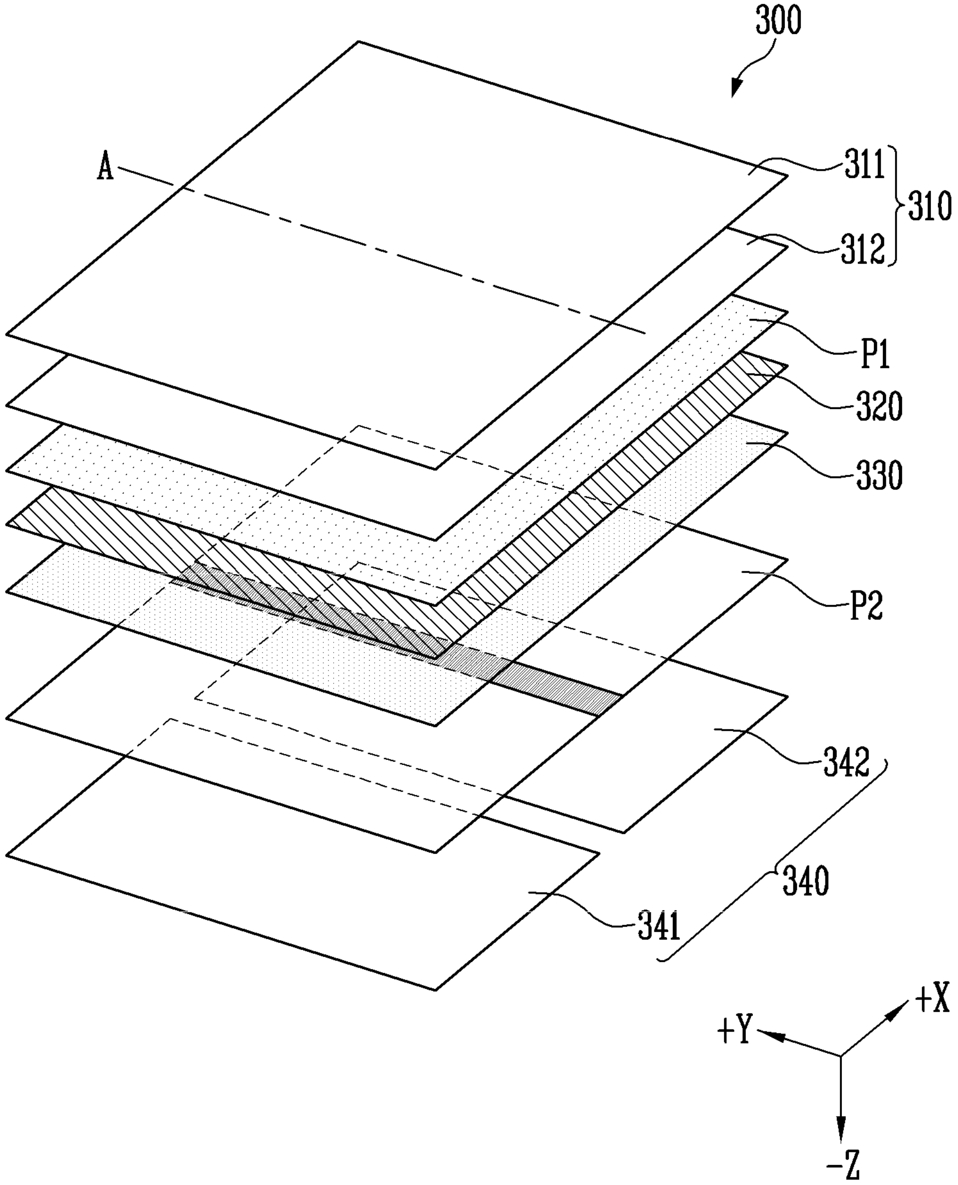
FIG. 4 is a schematic exploded perspective view illustrating an embodiment of a stack structure of a display shown in FIG. 1.

FIG. 4 is a schematic exploded perspective view illustrating an embodiment of a stack structure of the display shown in FIG. 1.

The display 300 according to embodiments of the disclosure may include a flexible or foldable display. In an embodiment, the display 300 may be an unbreakable (UB) type OLED display (e.g., a curved display).

In an embodiment, the display 300 may include a window layer 310, a polarizer (POL) 320, a display panel 330, and support plates 340 which are sequentially disposed on a rear surface (e.g., −z direction) of the window layer 310.

In an embodiment, the window layer 310 may have a size corresponding to a size of the display panel 330 and cover a front surface of the display panel 330. The window layer 310 may prevent damage to the display panel 330 caused by external impact due to repetitive user's touches or unintentional dropping.

In an embodiment, the window layer 310 may include a polymer layer 311 and a glass layer 312 attached to the polymer layer 311. The polymer layer 311 may include polyethylene terephthalate (PET), polyimide, the like, or a combination thereof. The glass layer 312 may include an ultra thin glass (UTG) or the like.

In an embodiment, the polymer layer 311 may protect the glass layer 312, the polarizer 320, and the display panel 330 from external impact. For example, the polymer layer 311 may protect the glass layer 312, and may prevent the glass layer 312 from shattering in case that a crack occurs in the glass layer 312. In an embodiment, the polymer layer 311 may include a glass, or may be formed of a film layer or a coating layer. The polymer layer 311 may include a flexible material. The polymer layer 311 may be formed of a transparent material having high light transmissivity.

In an embodiment, the polarizer 320 may include a polarization film. In an embodiment, the display 300 may include a color filter (not shown) instead of the polarizer 320. The color filter and the polarizer 320 may perform a same or similar role. For example, the foldable electronic device (e.g., the foldable electronic device 1 of FIG. 1) that includes a color filter may be a color filter on encapsulation (COE) type foldable electronic device 1. In the COE type foldable electronic device 1, transmissivity may be improved and the thickness of the display 300 may be reduced to in a range of about 100 μm to about 150 μm by replacing a function or role of the polarizer 320 with the color filter.

In an embodiment, the window layer 310 and the polarizer 320 may be attached to each other by an adhesive P1. The adhesive P1 may include at least one of an optical clear adhesive (OCA), a pressure sensitive adhesive (PSA), a thermo-responsive adhesive, a general adhesive, double-sided tape, and the like.

In an embodiment, the display 300 may further include a touch panel (not shown). The touch panel may be formed between the glass layer 312 and the polarizer 320.

In an embodiment, the display panel 330 may be foldable, and may display various contents (e.g., texts, images, videos, icons, and symbols) to a user.

In an embodiment, in the case where the display panel 330 is folded, the window layer 310 and the polarizer 320 may also be folded in a same direction along with the display panel 330.

In an embodiment, the support plates 340 may be disposed on a rear surface of the display panel 330 and include reinforcement plates made of a metal. The support plates 340 may assist to reinforce a stiffness of the display 300, may shield ambient noise, and may dissipate heat emitted from peripheral heat generating components. The support plates 340 may include at least one of stainless steel (STS), Cu, Al, CLAD (e.g., a stack in which STS and Al are alternately arranged), and the like. In an embodiment, the support plates 340 may include other alloy materials.

In an embodiment, the support plates 340 may include a first plate 341 and a second plate 342. The first plate 341 may face the first area (e.g., the first area RA1 of FIG. 1) of the display panel 330. The second plate 342 may face the second area (e.g., the second area RA2 of FIG. 1) of the display panel 330. The first plate 341 may face the first housing (e.g., the first housing 10 of FIG. 1). The second plate 342 may face the second housing (e.g., the second housing 20 of FIG. 2).

In an embodiment, the display 300 may further include at least one functional component disposed between the display panel 330 and the support plates 340. For example, the functional component may include a graphite sheet for heat dissipation, a flexible printed circuit board (FPCB), an antenna radiator for communication, a heat dissipation sheet, and conductive (or non-conductive) tape. The functional component may be disposed from the first housing 10 through the hinge structure (e.g., the hinge structure 400 of FIG. 3) to at least a portion of the second housing 20.

In an embodiment, the display panel 330 and the support plates 340 may be attached by an adhesive P2. The adhesive P2 may include at least one of an optical clear adhesive (OCA), a pressure sensitive adhesive (PSA), a thermo-responsive adhesive, a general adhesive, double-sided tape, and the like.

According to embodiments, the stack structure and stack order of the display 300 shown in FIG. 4 may be changed in various ways. At least some layers may be added or omitted in the stack structure and stack order of the display 300 shown in FIG. 4.

Figure 5:
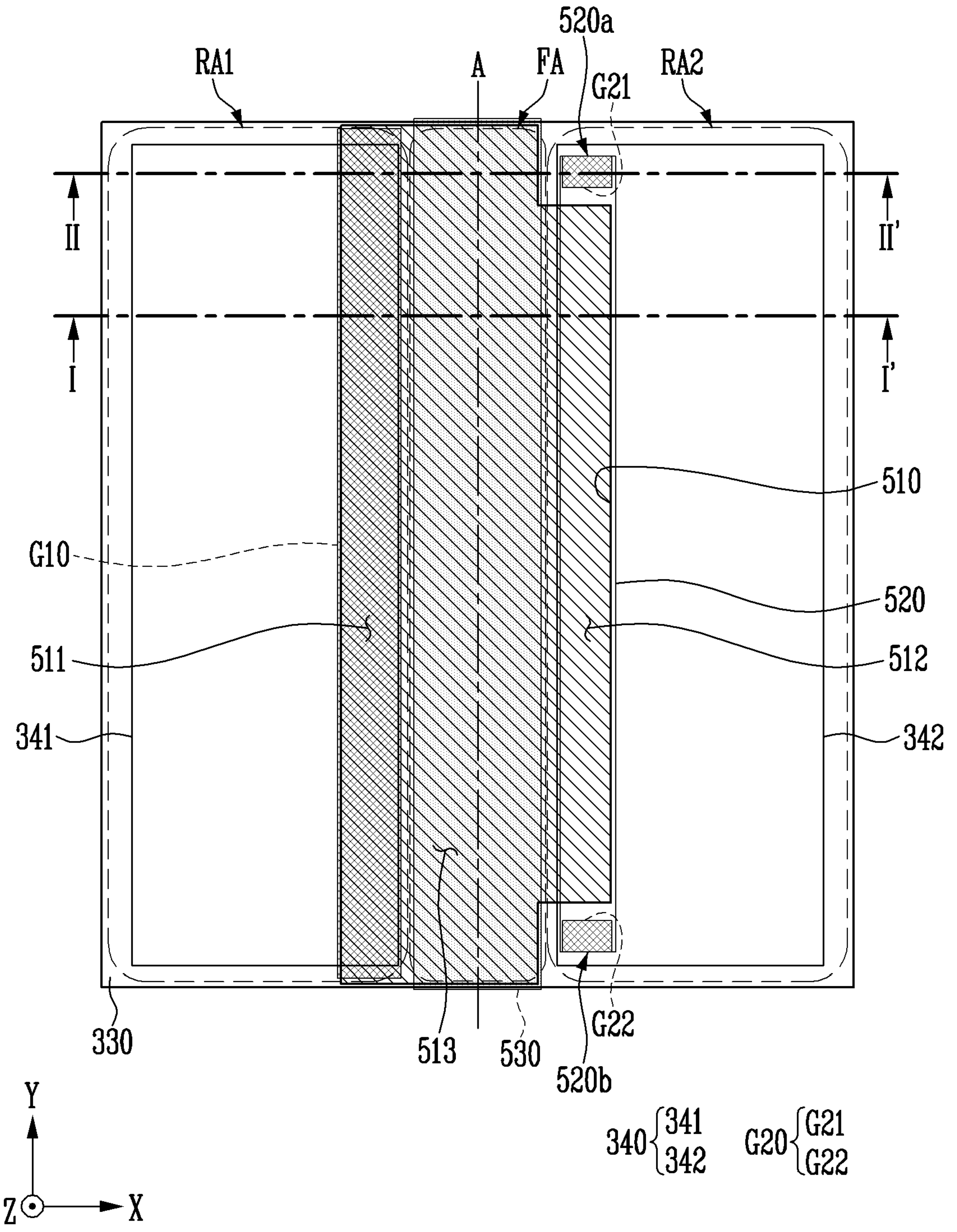
FIG. 5 is a schematic plan view illustrating an embodiment of a display panel of the display in the unfolded state shown in FIG. 4.

FIG. 5 is a schematic plan view illustrating an embodiment of the display panel of the display in the unfolded state shown in FIG. 4.

The unfolded state of the display 300 may refer to the state of the display 300 in the case where the foldable electronic device (e.g., the foldable electronic device 1 of FIG. 1) is in the unfolded state, and the folded state of the display 300 may refer to the state of the display 300 in the case where the foldable electronic device 1 is in the folded state (e.g., FIG. 2).

Referring to FIGS. 4 and 5, the display 300 may include the display panel 330, the support plates 340 disposed on the rear surface (e.g., −z direction of FIG. 4) of the display panel 330, a flexible thin-film layer 510, a guide 520, and a step difference compensator 530.

In an embodiment, the display panel 330 may include the first area RA1, the folding area FA, and the second area RA2 arranged in the first direction (e.g., +x direction). In an embodiment, the first area RA1 and the second area RA2 may be flat areas regardless of a shape of the display 300. For example, surface curvatures of the first area RA1 and the second area RA2 may remain constant regardless of the shape of the display 300. In an embodiment, the folding area FA may be folded about the folding axis A defined along the second direction (e.g., +y direction) intersecting the first direction (e.g., +x direction). The folding area FA may be a flat area in the case where the display 300 is in the unfolded state, and may be bent in the case where the display 300 is in the folded state. For example, the folding area FA may be an area that is bent only in the case where the display 300 is in the folded state. The curvature of the folding area FA may be changed in the case where the display 300 is converted between the folded and unfolded state about the folding axis A.

In an embodiment, the support plates 340 may be disposed on the rear surface of the display panel 330. In an embodiment, the first plate 341 and the second plate 342 may be disposed on the rear surface of the display panel 330. The first plate 341 may face the first area RA1 of the display panel 330 in the first direction (e.g., +x direction). The second plate 342 may be spaced apart from the first plate 341 in the first direction (e.g., +x direction), and may face the second area RA2 of the display panel 330. The first plate 341 and the second plate 342 may not overlap the folding area FA of the display panel 330 in a thickness direction of the display panel 330.

In an embodiment, the flexible thin-film layer 510 may be disposed on the rear surface of the display panel 330. In an embodiment, the flexible thin-film layer 510 may include a first portion 511, a third portion 513, and a second portion 512 arranged in the first direction (e.g., +x direction). The first portion 511 may cover at least an area of the first plate 341. The third portion 513 may connect the first portion 511 and the second portion 512, and may cover the folding area FA. The second portion 512 may cover at least an area of the second plate 342.

In an embodiment, the first portion 511 and the second portion 512 may be arranged at locations adjacent to the folding area FA. The first portion 511 may overlap at least an area of the first plate 341, and the second portion 512 may overlap at least an area of the second plate 342 in a thickness direction of the display panel 330.

In an embodiment, in the case where the display panel 330 is folded, the flexible thin-film layer 510 along with the display panel 330 may be folded in a same direction.

In an embodiment, the flexible thin-film layer 510 may include polyethylene terephthalate (PET), polyimide, the like, or a combination thereof.

In an embodiment, in the case where the display panel 330 is in the unfolded state, the first portion 511, the second portion 512, and the third portion 513 may be flat. In the case where the display panel 330 is in the folded state, a portion of the flexible thin-film layer 510 may be formed of a curved surface having a certain curvature.

In an embodiment, the first portion 511 of the flexible thin-film layer 510 may be attached to an area of the first plate 341 by a first adhesive element G10. The first portion 511 may be attached to an area of the first plate 341 regardless of the shape of the display panel 330, and a shape of the first portion 511 may be kept constant.

In an embodiment, at least an area of the second portion 512 of the flexible thin-film layer 510 may be disposed between the second plate 342 and the guide 520. In an embodiment, the second portion 512 of the flexible thin-film layer 510 may be formed to pass between the second plate 342 and the guide 520. In an embodiment, in the case where the display panel 330 is converted between the folded and unfolded state, the second portion 512 may slide between the second plate 342 and the guide 520.

In an embodiment, the third portion 513 of the flexible thin-film layer 510 may connect the first portion 511 and the second portion 512, and may be foldable about the folding axis A. In an embodiment, the third portion 513 may overlap the folding area FA (or the hinge structure 400 of FIG. 3) of the display panel 330 in a plan view.

In an embodiment, in the case where the display panel 330 is in the unfolded state, each of the first portion 511, the second portion 512, and the third portion 513 may be flat. In the case where the display panel 330 is in the folded state, a portion of the flexible thin-film layer 510 (or the third portion 513) may be formed of a curved surface having a certain curvature.

In an embodiment, the flexible thin-film layer 510 may have a symmetrical shape about an axis (e.g., the axis defined in the first direction (e.g., +x direction)) intersecting the folding axis A.

In an embodiment, the guide 520 may cover at least an area of the second portion 512 of the flexible thin-film layer 510 and an area of the second plate 342. For example, the guide 520 may be disposed on a rear surface (e.g., −z direction) of at least an area of the second portion 512 of the flexible thin-film layer 510 and an area of the second plate 342. In an embodiment, in the case where the display panel 330 is converted between the folded and unfolded state, the guide 520 may guide a sliding of the second portion 512 of the flexible thin-film layer 510.

In an embodiment, the guide 520 may have a shape of a bar extending in the second direction (e.g., +y direction). However, the disclosure is not limited thereto, and the guide 520 may have any shape as long as it is possible to guide the movement of the second portion 512 of the flexible thin-film layer 510.

In an embodiment, the guide 520 may include a first end 520*a* and a second end 520*b* adjacent to each end of the guide 520 in a longitudinal direction. The first end 520*a* and the second end 520*b* of the guide 520 may be attached to an area of the second plate 342 by at least one second adhesive element G20.

In an embodiment, the second adhesive element G20 may include a 2-1-th adhesive element G21 and a 2-2-th adhesive element G22. In an embodiment, the first end 520*a* of the guide 520 may be attached to the second plate 342 by the 2-1-th adhesive element G21. The second end 520*b* of the guide 520 may be attached to the second plate 342 by the 2-2-th adhesive element G22.

In an embodiment, in a plan view, the second adhesive element G20 may not overlap the second portion 512 of the flexible thin-film layer 510.

In an embodiment, each of the first adhesive element G10 and the second adhesive element G20 may include at least one of double-sided tape, a general adhesive, a thermo-responsive adhesive, an optical clear adhesive (OCA), and the like.

In an embodiment, in a plan view, the second portion 512 of the flexible thin-film layer 510 may move between the first end 520*a* and the second end 520*b* of the guide 520. The second portion 512 may slide between the guide 520 and the second plate 342 in case that the display panel 330 is folded or unfolded.

In an embodiment, as the first plate 341 and the second plate 342 are disposed on opposite sides of the folding area FA to be spaced apart from each other, a step difference may be formed in an area corresponding to the folding area FA in a thickness direction of each of the first and second plates 341 and 342.

In an embodiment, the step difference compensator 530 may be disposed between the folding area FA of the display panel 330 and the third portion 513 of the flexible thin-film layer 510. In an embodiment, the step difference compensator 530 may be attached to the third portion 513 of the flexible thin-film layer 510. In an embodiment, the step difference compensator 530 may be formed in a shape of a bar extending in the second direction (e.g., +y direction). However, the disclosure is not limited thereto, and various shapes are possible as long as the step difference compensator 530 can compensate for the step difference formed between the first plates 341 and the second plates 342.

Figure 6:
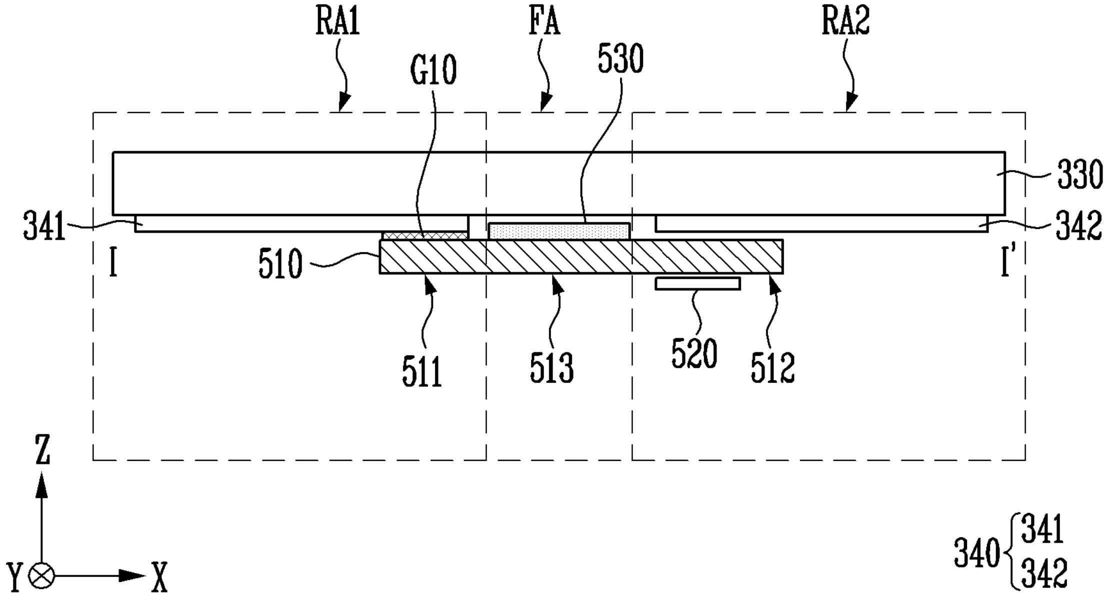
FIG. 6 is a schematic cross-sectional view illustrating an embodiment taken along line I-I' shown in FIG. 5.
Figure 7:
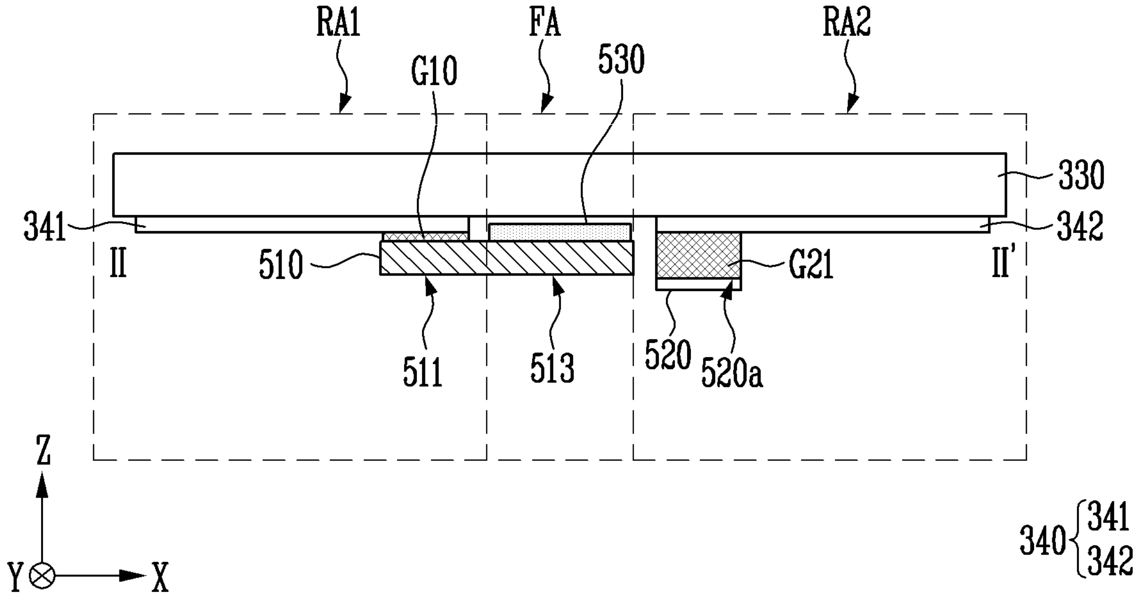
FIG. 7 is a schematic cross-sectional view illustrating an embodiment taken along line II-II' shown in FIG. 5.

FIG. 6 is a schematic cross-sectional view illustrating an embodiment taken along line I-I' shown in FIG. 5. FIG. 7 is a schematic cross-sectional view illustrating an embodiment taken along line II-II' shown in FIG. 5.

Referring to FIGS. 6 and 7, the flexible thin-film layer 510 may be disposed on the rear surface of the display panel 330. In an embodiment, the flexible thin-film layer 510 may cover at least an area of the first area RA1, at least an area of the second area RA2, and the folding area FA. As the flexible thin-film layer 510 completely covers the folding area FA, it is possible to prevent foreign substances from being introduced into the folding area FA of the display panel 330.

In an embodiment, in the state where the display panel 330 is unfolded, the step difference may be formed in the folding area FA of the display panel 330 in the thickness direction of each of the first and second plates 341 and 342. In order to compensate for the step difference, the step difference compensator 530 may be disposed between the folding area FA of the display panel 330 and the third portion 513. In an embodiment, a thickness of the step difference compensator 530 and thicknesses of the first and second plates 341 and 342 may be substantially same. In an embodiment, the step difference compensator 530 may be attached to a surface of the third portion 513 of the flexible thin-film layer 510.

In an embodiment, the first portion 511 of the flexible thin-film layer 510 may be attached to an area of the first plate 341 by the first adhesive element G10. For example, a length of the first portion 511 of the flexible thin-film layer 510 in the first direction (e.g., +x direction) may be constant. In an embodiment, as the display panel 330 is converted between the folded and unfolded state, the third portion 513 of the flexible thin-film layer 510 may form a certain curvature. In an embodiment, as the display panel 330 is converted between the folded and unfolded state, the second portion 512 may slide between the guide 520 and the second plate 342. For example, as the display panel 330 is converted between the folded and unfolded state, a length of the second portion 512 in the first direction (e.g., +x direction) overlapping the second plate 342 may vary.

Referring to FIG. 7, the first end 520*a* of the guide 520 may be attached to an area of the second plate 342 by the 2-1-th adhesive element G21. The thickness of the 2-1-th adhesive element G21 (and the 2-2-th adhesive element G22 of FIG. 5) and the thickness of the flexible thin-film layer 510 may be substantially same in the thickness direction of the display panel 330. In an embodiment, in the state where the display panel 330 is unfolded, the 2-1-th adhesive element G21 and the flexible thin-film layer 510 may be disposed on a same plane.

Figure 8:
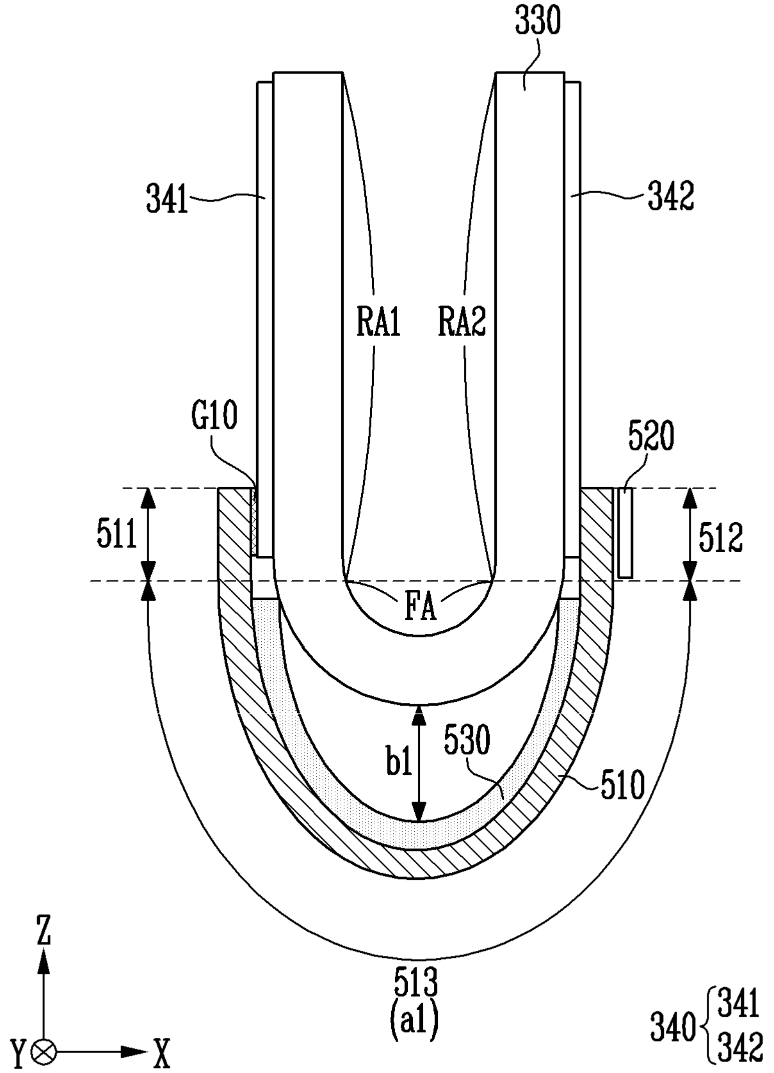
FIG. 8 is a schematic cross-sectional view illustrating an embodiment of the display panel of the display in the folded state shown in FIG. 4.
Figure 9:
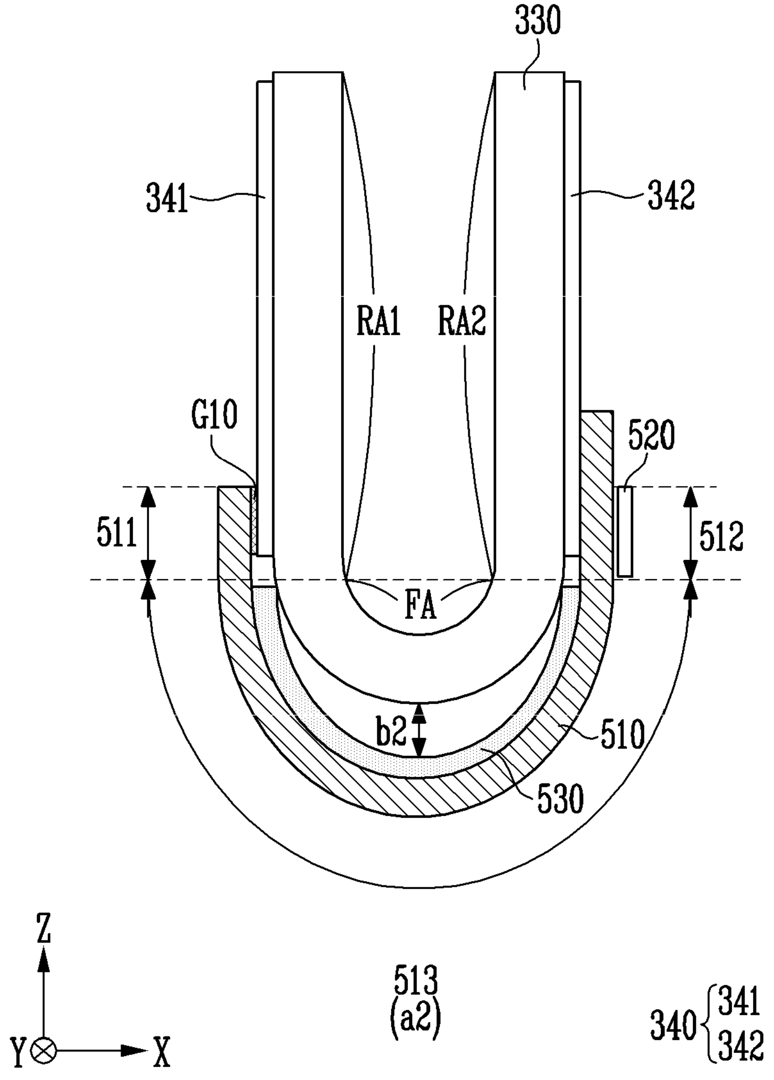
FIG. 9 is a schematic cross-sectional view illustrating another embodiment of the display panel of the display in the folded state shown in FIG. 4.

FIG. 8 is a schematic cross-sectional view illustrating an embodiment of the display panel of the display in the folded state shown in FIG. 4. FIG. 9 is a schematic cross-sectional view illustrating another embodiment of the display panel of the display in the folded state shown in FIG. 4.

Referring to FIGS. 8 and 9, in the case where the display panel 330 is in the folded state, the first plate 341 and the second plate 342 may be disposed to face each other.

In an embodiment, in the case where the display panel 330 is in the folded state, the third portion 513 of the flexible thin-film layer 510 may be curved with a certain curvature.

In an embodiment, the first portion 511 of the flexible thin-film layer 510 may be attached to the first plate 341 by the first adhesive element G10. The first portion 511 may be a flat area regardless of the shape or folding state of the display panel 330. The length of the first portion 511 may remain constant.

In an embodiment, in the case where the display panel 330 is converted from the unfolded state to the folded state, the second portion 512 of the flexible thin-film layer 510 may slide clockwise toward the folding area FA. In an embodiment, in the case where the display panel 330 is converted from the folded state to the unfolded state, the second portion 512 of the flexible thin-film layer 510 may slide counterclockwise toward the second area RA2.

In an embodiment, in the case where the display panel 330 is converted between the folded and unfolded state, a cross-sectional area of the second portion 512 covering the second plate 342 and the third portion 513 covering the folding area FA may change. In an embodiment, the cross-sectional area of the second portion 512 covering the second plate 342 in the case where the display panel 330 is in the unfolded state may be greater than the cross-sectional area of the second portion 512 covering the second plate 342 in the case where the display panel 330 is in the folded state. In contrast, the cross-sectional area of the third portion 513 covering the folding area FA in the case where the display panel 330 is in the unfolded state may be less than the cross-sectional area of the third portion 513 covering the folding area FA in the case where the display panel 330 is in the folded state.

In an embodiment, in the case where the display panel 330 is converted from the unfolded state to the folded state, a space may be formed between the folding area FA of the display panel 330 and the step difference compensator 530. In an embodiment, as the curvature of the third portion 513 of the flexible thin-film layer 510 increases, the space formed between the folding area FA of the display panel 330 and the step difference compensator 530 may be increased.

In an embodiment, in the case where the display panel 330 is in the folded state, the curvature of the display panel 330 may be smaller than the curvature of the flexible thin-film layer 510.

In an embodiment, in the case where the display panel 330 is converted from the unfolded state to the folded state, the first portion 511 of the flexible thin-film layer 510 may be attached to the first plate 341, and the second portion 512 may slide between the second plate 342 and the guide 520. In the case where the display panel 330 is in the folded state, the flexible thin-film layer 510 may form a curvature greater than the curvature of the display panel 330.

In an embodiment, in the case where the display panel 330 is converted from the unfolded state to the folded state, the third portion 513 of the flexible thin-film layer 510 may change to have different curvatures.

FIG. 8 shows the case in which the curvature of the third portion 513 of the flexible thin-film layer 510 is a first curvature, and FIG. 9 shows the case in which the curvature of the third portion 513 of the flexible thin-film layer 510 is a second curvature less than the first curvature.

In the case where the display panel 330 is converted from the unfolded state to the folded state, the curvature of the third portion 513 of the flexible thin-film layer 510 may increase as the cross-sectional area of the flexible thin-film layer 510 sliding clockwise toward the folding area FA increases.

In an embodiment, as the curvature of the third portion 513 of the flexible thin-film layer 510 increases, a distance between the third portion 513 of the flexible thin-film layer 510 and the display panel 330 in the third direction (e.g., +z direction) may increase. In an embodiment, a distance b1 between the third portion 513 having the first curvature and the display panel 330 may be greater than a distance b2 between the third portion 513 having the second curvature and the display panel 330.

In an embodiment, as the curvature of the third portion 513 of the flexible thin-film layer 510 increases, a length of an arc of the curved surface formed on the third portion 513 of the flexible thin-film layer 510 may increase. In an embodiment, a length a1 of the arc of the third portion 513 having the first curvature may be greater than a length a2 of the arc of the third portion 513 having the second curvature.

In an embodiment, the flexible thin-film layer 510 may support the display panel 330 within a wider movement range according to folding characteristics of the display panel.

In an embodiment, the flexible thin-film layer 510 may prevent foreign substances from being introduced into the folding area FA of the display panel 330.

Figure 10:
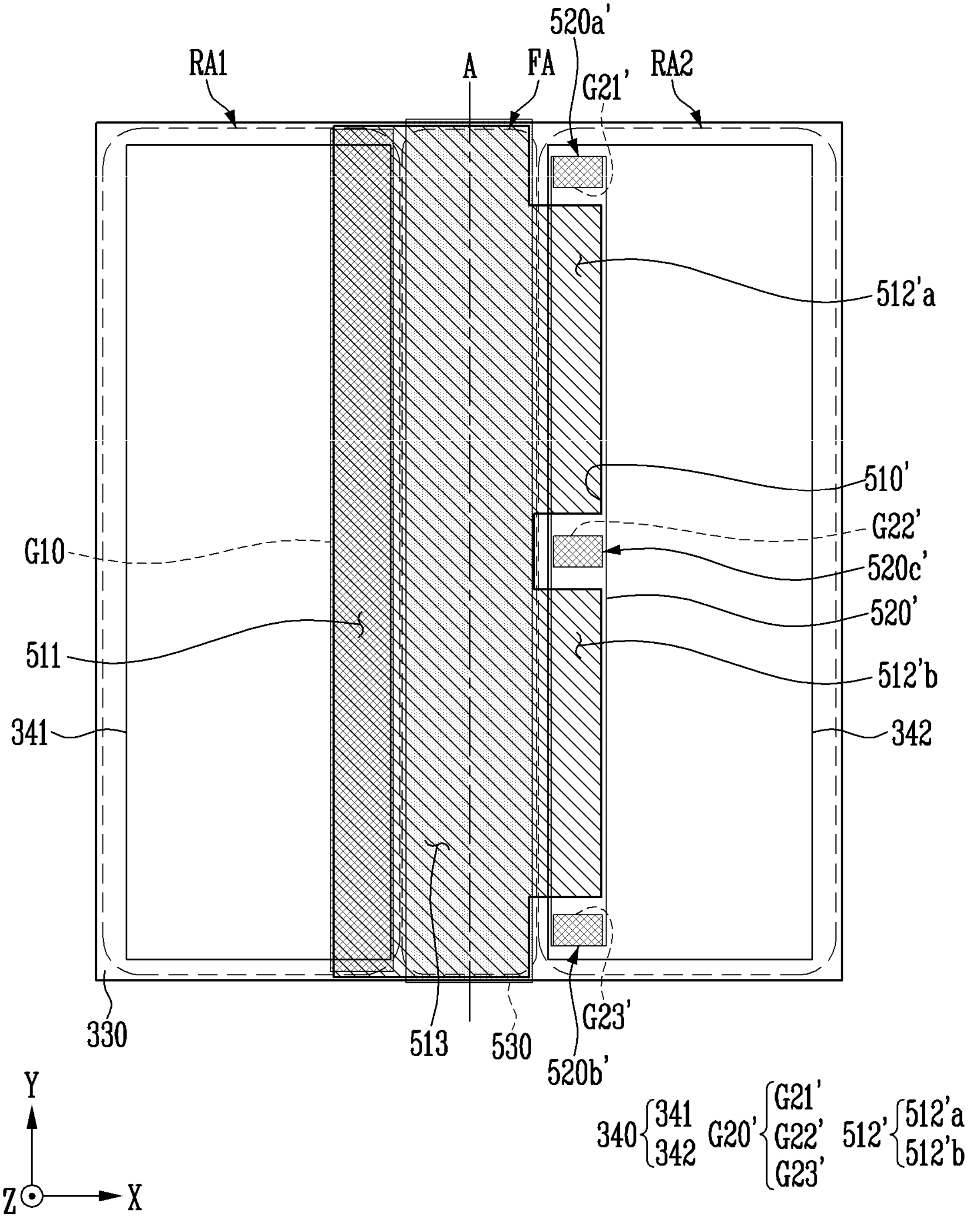
FIG. 10 is a schematic plan view illustrating another embodiment of the unfolded state of the display panel of a stack structure of the display shown in FIG. 4.

FIG. 10 is a schematic plan view illustrating another embodiment of the unfolded state of the display panel of the stack structure of the display shown in FIG. 4.

Referring to FIG. 10, since components other than a flexible thin-film layer 510', a guide 520', and a second adhesive element G20' may be same as those shown in FIG. 5, the same reference numerals are used for the same or corresponding components, and redundant description thereof is omitted.

Referring to FIG. 10, the guide 520' may include a first end **520*a*', a central portion 520*c*', and a second end 520*b*' in a longitudinal direction of the guide 520'. The first end 520*a*', the central portion 520*c*', and the second end 520*b*' of the guide 520' may be attached to an area of the second plate 342 by at least one second adhesive element G20'**.

In an embodiment, the second adhesive element G20' may include a 2-1-th adhesive element G21', a 2-2-th adhesive element G22', and a 2-3-th adhesive element G23' arranged in the second direction (e.g., −y direction). In an embodiment, a distance between the 2-1-th adhesive element G21' and the 2-2-th adhesive element G22' and a distance between the 2-2-th adhesive element G22' and the 2-3-th adhesive element G23' may be same. The first end **520*a*' of the guide 520' may be attached to the second plate 342 by the 2-1-th adhesive element G21'. The second end 520*b*' of the guide 520' may be attached to the second plate 342 by the 2-3-th adhesive element G23'. The central portion 520*c*' of the guide 520' may be attached to the second plate 342 by the 2-2-th adhesive element G22'**.

In an embodiment, the flexible thin-film layer 510' may have a symmetrical shape about an axis (e.g., an axis defined in the first direction (e.g., +x direction)) intersecting the folding axis A.

In an embodiment, the flexible thin-film layer 510' may include at least one second portion 512' protruding from the third portion 513 in the first direction (e.g., +x direction). In a plan view, the at least one second portion 512' may not overlap the at least one second adhesive element G20' in a plan view. In an embodiment, the at least one second portion 512' may include a 2-1-th portion 512'*a* disposed between the first end 520*a'* and the central portion 520*c'*, and a 2-2-th portion 512'*b* disposed between the central portion 520*c'* and the second end 520*b'*.

In an embodiment, the 2-1-th portion 512'*a* may slide between the first end 520*a'* and the central portion 520*c'* in case that the display panel 330 is folded or unfolded. The 2-2-th portion 512'*b* may slide between the central portion 520*c'* and the second end 520*b'* in case that the display panel 330 is folded or unfolded.

A display device and a foldable electronic device according to embodiments of the disclosure may prevent foreign substances from being introduced from an outside through a flexible thin-film layer 510 or 510'.

It is possible to support a display panel 330 within a wider movement range according to folding characteristics of the display panel 330 through a flexible thin-film layer 510 or 510' disposed on a rear surface of the display panel 330.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A display device comprising:

a display panel including a first area, a folding area, and a second area arranged in a first direction, the folding area being foldable about a folding axis parallel to a second direction intersecting the first direction;

a first plate disposed on a rear surface of the display panel in the first area;

a second plate disposed on the rear surface of the display panel in the second area and spaced apart from the first plate in the first direction;

a flexible thin-film layer disposed on the rear surface of the display panel and including:

a first portion covering at least an area of the first plate;

a second portion covering at least an area of the second plate; and a third portion connecting the first portion and the second portion and disposed on the folding area;

a guide that covers the second portion of the flexible thin-film layer and at least an area of the second plate, and a step difference compensator disposed between the folding area of the display panel and the third portion of the flexible thin-film layer, wherein the step difference compensator is attached to the third portion of the flexible thin-film layer, and is not attached to the folding area of the display panel, and wherein:

the flexible thin-film layer has an asymmetrical shape about the folding axis when the display device is in an unfolded state, and in case that the display panel is converted between a folded state and the unfolded state, the first portion of the flexible thin-film layer is attached to the first plate, and the second portion of the flexible thin-film layer slides between the guide and the second plate.

2. The display device according to claim 1, further comprising:

a first adhesive element disposed between the first plate and the first portion of the flexible thin-film layer, wherein the first portion of the flexible thin-film layer is attached to an area of the first plate by the first adhesive element.

3. The display device according to claim 2, wherein the second portion of the flexible thin-film layer protrudes from the third portion in the first direction, and a shape of the flexible thin-film layer is symmetrical about an axis intersecting the folding axis.

4. The display device according to claim 2, wherein the guide extends in the second direction, and opposite ends of the guide are attached to at least an area of the second plate.

5. The display device according to claim 2, further comprising:

at least one second adhesive element disposed between the second plate and the guide, wherein the guide is attached to at least an area of the second plate by the at least one second adhesive element.

6. The display device according to claim 5, wherein each of the first adhesive element and the at least one second adhesive element comprises at least one of a double-sided tape, a general adhesive, a thermo-responsive adhesive, and an optical clear adhesive (OCA).

7. The display device according to claim 5, wherein a thickness of the at least one second adhesive element and a thickness of the flexible thin-film layer are same in a thickness direction of the display panel.

8. The display device according to claim 7, wherein in case that the display panel is in the unfolded state, the at least one second adhesive element and the flexible thin-film layer are disposed on a same plane.

9. The display device according to claim 5, wherein the at least one second adhesive element comprises a plurality of second adhesive elements, and the second portion of the flexible thin-film layer is disposed between the plurality of second adhesive elements.

10. The display device according to claim 9, wherein the plurality of second adhesive elements comprise:

a 2-1-th adhesive element; and a 2-2-th adhesive element arranged in the second direction, and in case that the display panel is converted between the folded state and the unfolded state, the second portion of the flexible thin-film layer slides between the 2-1-th adhesive element and the 2-2-th adhesive element.

11. The display device according to claim 9, wherein the plurality of second adhesive elements comprise:

a 2-1-th adhesive element;

a 2-2-th adhesive element; and a 2-3-th adhesive element arranged in the second direction, and in case that the display panel is converted between the folded state and the unfolded state, the second portion of the flexible thin-film layer slides between the 2-1-th adhesive element and the 2-2-th adhesive element and between the 2-2-th adhesive element and the 2-3-th adhesive element.

12. The display device according to claim 1, wherein the second portion and the third portion of the flexible thin-film layer are not attached to the second plate nor the folding area of the display panel.

13. The display device according to claim 1, wherein in case that the display panel is in the folded state, a distance between the first plate and the first portion of the flexible thin-film layer is less than a distance between the second plate and the second portion of the flexible thin-film layer.

14. The display device according to claim 1, wherein in case that the display panel is in the folded state, a space is formed between the display panel and the third portion of the flexible thin-film layer.

15. The display device according to claim 1, wherein the display panel comprises a curved surface having a first curvature in case that the display panel is in the folded state, and the flexible thin-film layer comprises a curved surface having a second curvature larger than the first curvature.

16. A foldable electronic device comprising:

a first housing;

a second housing connected to the first housing through a hinge structure and rotatable about the hinge structure;

a display panel disposed on an area of the first housing and an area of the second housing and foldable by rotation;

a first plate disposed on a rear surface of the display panel and facing the first housing;

a second plate disposed on the rear surface of the display panel, facing the second housing, and spaced apart from the first plate in a first direction;

a flexible thin-film layer comprising:

a first portion disposed on the rear surface of the display panel and overlapping the first plate in a thickness direction of the display panel;

a second portion overlapping the second plate in the thickness direction; and a third portion connecting the first portion and the second portion and disposed on the hinge structure;

a guide disposed on at least an area of the second plate and a rear surface of the second portion of the flexible thin-film layer; and a step difference compensator disposed between the first plate and the second plate, wherein the step difference compensator is attached to the third portion of the flexible thin-film layer, and is not attached to the display panel, and wherein:

in case that the display panel is converted between a folded state and an unfolded state, the first portion of the flexible thin-film layer is attached to the first plate, and the second portion of the flexible thin-film layer slides under guidance of the guide.

17. The foldable electronic device according to claim 16, further comprising:

a first adhesive element disposed between the first plate and the first portion of the flexible thin-film layer; and at least one second adhesive element disposed between the second plate and the guide, wherein the at least one second adhesive element does not overlap the flexible thin-film layer in the thickness direction.

18. A display device comprising:

a display panel including a first area, a folding area, and a second area arranged in a first direction, the folding area being foldable about a folding axis parallel to a second direction intersecting the first direction;

a first plate disposed on a rear surface of the display panel in the first area;

a second plate disposed on the rear surface of the display panel in the second area and spaced apart from the first plate in the first direction;

a flexible thin-film layer disposed on the rear surface of the display panel and including:

a first portion covering at least an area of the first plate;

a second portion covering at least an area of the second plate; and a third portion connecting the first portion and the second portion and disposed on the folding area;

a guide that covers the second portion of the flexible thin-film layer and at least an area of the second plate; and a step difference compensator disposed between the folding area of the display panel and the third portion of the flexible thin-film layer, wherein the step difference compensator is attached to the third portion of the flexible thin-film layer, and is not attached to the folding area of the display panel, and wherein:

in case that the display panel is converted between a folded state and an unfolded state, the first portion of the flexible thin-film layer is attached to the first plate, and the second portion of the flexible thin-film layer slides between the guide and the second plate.

* * * * *